– – –

United States Patent Office 3,117,107
Patented Jan. 7, 1964

3,117,107
COPOLYESTERS
James Walter Stimpson, Neil Munro, and Isaac Goodman, Harrogate, England, assignors to Imperial Chemical Industries Limited, London, England, a company of Great Britain
No Drawing. Filed Oct. 5, 1959, Ser. No. 844,187
Claims priority, application Great Britain Oct. 24, 1958
7 Claims. (Cl. 260—75)

This invention relates to copolyesters, in particular to copolyesters obtained from terephthalic acid.

The range of polyesters having the general formula

where $n=2$ to 10 inclusive, is a source of valuable fibres and films. The best known member of the series is polyethylene terephthalate which is manufactured on a commercial scale in many countries. The preparation of such polyesters from terephthalic acid or functional derivatives thereof is described in British Patents 578,079 and 590,451.

It is accepted that the unique properties of polyethylene terephthalate emanate from the aromatic paradicarboxylic acid grouping, terephthalic acid itself being an unusually intractable compound. Thus these esters exhibit such features as outstanding resistance to hydrolysis and chemical attack and high softening point. While these properties are most useful in fibres and films there are certain attendant disadvantages, for example, the resistance to water and chemical reagents is, in part, a function of the compact nature of the linear molecules which allows tight packing of the chains and this also results in the prevention of ready penetration by dyestuffs. The structure of the molecule similarly confers on fibres derived therefrom valuable tensile properties such as high tenacity and so on but this is paralleled by a tendency towards "pilling" in fabrics. Thus it can be considered a useful advance to modify the polyester in such a way that certain outstanding properties are partially sacrificed in order to remove shortcomings such as have been already described. In this way it is possible to arrive at a polyester having the best all-round combination of properties or, alternatively to aim at the production of that particular set of properties required by a particular commercial outlet.

The most promising line of attack on this problem has been the preparation of copolyesters which are based on terephthalic acid and ethylene glycol and contain also a minor amount of at least one other glycol or acid. In the simplest case the modifying component is another dibasic acid or glycol which becomes part of the linear polymer chain and brings about some disruption of the compact structure of polyethylene terephthalate but is witthout chemical effect on the properties of the derived fibres and films. Such a technique is described in British Patents 676,372, 711,279 and 711,280. The modifier may, however, contain chemically reactive groupings, for example, those which produce in the fibres a desired affinity for certain classes of dyestuffs. Suitable reactive groupings are ethers (British Patent 682,866), amines (British Patent 734,416) and sulphonates (Belgian Patents 549,179 and 562,460).

We have now discovered that copolyesters in which the linear molecule is modified by the introduction of pendant aromatic nuclei have the following advantages:

(1) The bulky nature of the pendant groups readily disturbs chain packing and crystallinity so that a small proportion of second component brings about a relatively large improvement in ease of penetration of dyestuff.

(2) The pendant groups may be either homocyclic or heterocyclic in character. In the former case substitution of the pendant aromatic groups offers a convenient method of of introducing affinity for any class of dyestuff or chemical reagent which may be used in subsequent treatment of fibres etc. Combinations of substituent groups are similarly possible. Where the pendant groups are of a heterocyclic nature they may themselves be reactive towards dyestuffs and other reagents, for example, when the ring contains nitrogen and therefore functions as a basic component.

According to the present invention we provide a process for the preparation of copolyesters characterised in that ethylene glycol is reacted with terephthalic acid or a functional derivative thereof and at least one compound having the formula

where R and R' are —OH, —COOH or —COO alkyl groups,
X is a hydrocarbon nucleus, and
Y is a substituent group which is aromatic in character and the resultant mixed glycol esters are polycondensed.

It is preferred that the third component be present in amount not exceeding 10 mols percent.

By groups aromatic in character is meant homocyclic or heterocyclic substituents such as phenyl, naphthyl, fluorenyl, pyridyl, indoyl and imidazolyl or derivatives thereof. The aromatic group may be attached directly to the main polymer chain being introduced, for example, as phenylalkylene or phenylarylene dicarboxylic acids. It is, however, also possible to attach the aromatic groupings indirectly, for example through a linkage such as methylene, polymethylene, ether oxygen, sulphur and so on.

To provide directly attached aromatic groupings suitable modifying components may be prepared by diazotisation of amino substituted acids followed by coupling with an aromatic compound such as benzene. It is convenient to work with modifying acids in the form of their dialkyl esters which may then be introduced into the polyester by ester-interchange. Among the modifying acids we have found 5-phenylisophthalic acid or alternatively a dialkyl 5-phenylisophthalate to be very suitable for our purpose.

Another useful modifying agent according to our invention is a dialkyl benzyl malonate which may be readily prepared by reacting benzyl chloride with a malonic ester.

Our copolyesters may be prepared by any method applicable to the preparation of highly polymeric polymethylene terephthalates and in general similar processing conditions may be used. These methods include ester-interchange between the appropriate mixed dialkyl esters and glycols and direct esterification of acids with glycols. A wide range of catalysts, notably metallic substances, may be used in these reactions—for example it is preferred to catalyse ester-interchange by means of an alkaline earth compound such as a compound of zinc, lead, calcium or magnesium and to promote polycondensation by means of compounds of antimony. Acids of phosphorus and esters thereof may be advantageously added as stabilisers at any stage of copolyester formation.

The following examples are provided to illustrate our invention.

EXAMPLE 1

*Preparation of Dimethyl 5-Phenylisophthalate*

Dimethyl 5-aminoisophthalate (106 parts), concentrated hydrochloric acid (160 parts) and water (120 parts) were stirred till complete solution was achieved then cooled to 0° C. and ice (100 parts) added to further reduce the temperature to −10° C. A solution of sodium nitrite (36 parts) in water (100 parts) was slowly introduced the temperature being kept below +10° C. The solution gave a positive starch-iodine test on completion of diazotisation.

Benzene (1500 parts) was stirred and cooled to 6° C. before the diazo solution was poured in and calcium carbonate (38 parts) added portion-wise over 10 minutes. The reaction mixture was finally stirred at 6–10° C. for 20 hours then at room temperature for 96 hours. The solids were next removed by filtration and the residual solution evaporated under reduced pressure leaving a tacky dark-red residue which was purified by dissolution in hot caustic soda solution and re-precipitation with hydrochloric acid.

The 5-phenylisophthalic acid obtained in this way was esterified with methanol in the presence of sulphuric acid catalyst and the dimethyl 5-phenylisophthalate purified by recrystallisation from fresh methanol. The product had melting point 93–4° C. and analysis showed carbon= 70.0%, hydrogen=5.3% ($C_{16}H_{14}O_4$ requires carbon= 71.0%, hydrogen=5.2%).

*Preparation of Terephthalic Acid/5-Phenylisophthalic Acid/Ethylene Glycol Copolyester*

Dimethyl terephthalate (18.4 parts), dimethyl 5-phenylisophthalate (1.35 parts) and ethylene glycol (31 parts) were ester-interchanged at the boil in the presence of litharge (0.01 part), methanol being removed by distillation as it was formed. After removal of the gross excess of ethylene glycol polycondensation of the residual glycol esters was carried out at 275° C. and 0.2 mm. Hg pressure, giving after 3 hours a copolyester having intrinsic viscosity 0.52 (1% o-chlorophenol, 25° C.) and softening point 248° C.

EXAMPLE 2

*Preparation of Terephthalic Acid/Benzyl Malonic Acid/Ethylene Glycol Copolyester*

Dimethyl terephthalate (110 pt.), diethyl benzyl malonate (7.9 pt.) and ethylene glycol (84 pt.) were ester interchanged over the temperature range 140–200° C., in the presence of zinc acetate (.02 pt.) and antimony trioxide (0.4 pt.), the methanol being removed by distillation as it was formed.

After removal of the gross excess of ethylene glycol, the low polymer was polymerised at 280° C. and 0.3 mm. Hg pressure for 5 hours. The polymer had an intrinsic viscosity of 0.51 (1%, o-chlorphenol, 25°) and softening point 245° C.

By melt spinning, fibres were obtained from the copolyesters of Examples 1 and 2 which showed a much improved uptake of dispersed acetate dyestuffs compared to polyethylene terephthalate.

What we claim is:

1. Copolyesters of ethylene glycol and terephthalic acid together with at least one compound having the formula

in which R and R' are selected from the group consisting of hydroxyl, carboxyl and carbalkoxy, X is selected from the group consisting of benzene and methane in which hydrogen atoms have been replaced by the groups R, R' and Y, and Y is selected from the group consisting of phenyl, naphthyl, fluorenyl, pyridyl, indoyl and imidazolyl groups connected to X directly and phenyl, naphthyl, fluorenyl, pyridyl, indoyl and imidazolyl groups connected to X through a member of the group consisting of methylene and polymethylene.

2. Copolyesters of ethylene glycol, benzyl malonic acid and terephthalic acid, the amount of benzyl malonic acid being about 2.5–10 mole percent.

3. Copolyesters of ethylene glycol, terephthalic acid and 5-phenylisophthalic acid, the amount of 5-phenylisophthalic acid being about 2.5–10 mole percent.

4. A process for the preparation of copolyesters which comprises reacting to form mixed glycol esters, ethylene glycol, a member of the group consisting of terephthalic acid and its lower alkyl esters, and at least one compound having the formula

in which R and R' are selected from the group consisting of hydroxyl, carboxyl and carboalkoxy, X is selected from the group consisting of benzene and methane in which hydrogen atoms have been replaced by R, R' and Y, and Y is selected from the group consisting of phenyl, naphthyl, fluorenyl, pyridyl, indoyl and imidazolyl groups connected to X directly and phenyl, naphthyl, fluorenyl, pyridyl, indoyl and imidazolyl groups connected to X through a member of the group consisting of methylene and polymethylene, and heating the resultant mixed glycol esters to polycondense them.

5. A process for the preparation of copolyesters as set forth in claim 4 in which said compound having the formula

is dimethyl-5-phenylisophthalate.

6. A process for the preparation of copolyesters as set forth in claim 4 in which said compound having the formula

is diethyl benzyl malonate.

7. A process for the preparation of copolyesters as set forth in claim 4 in which the reaction to form the mixed glycol esters and the polycondensation are carried out at elevated temperatures in the presence of a metallic catalyst.

References Cited in the file of this patent

UNITED STATES PATENTS

| 2,465,319 | Whinfield | Mar. 22, 1949 |
| 2,589,687 | Flory | Mar. 18, 1952 |
| 2,727,881 | Caldwell | Dec. 20, 1955 |
| 2,740,768 | Sullivan | Apr. 3, 1956 |
| 3,043,806 | Caldwell | July 10, 1962 |